United States Patent Office 3,449,491
Patented June 10, 1969

3,449,491
NEMATOCIDAL USE OF TRIS-AMMONIUM DITHIOPHOSPHATE

Stanley J. Brois, Matawan, N.J., assignor to Esso Research and Engineering Company, a corporation of Delaware
No Drawing. Filed Apr. 28, 1966, Ser. No. 545,841
Int. Cl. A01n 9/36, 7/00
U.S. Cl. 424—128                                5 Claims

ABSTRACT OF THE DISCLOSURE

This disclosure relates to fertilizer and pesticidal compositions comprising tris-ammonium dithiophosphate, derived as a hydrolysis product from reaction of $P_2S_5$ with aqueous ammonia, and methods of using such compositions as fertilizers and pesticides.

---

The present invention relates to tris-ammonium dithiophosphate. In general, it concerns agricultural compositions comprising tris-ammonium dithiophosphate. In particular, this invention concerns pesticidal and fertilizer compositions comprising tris-ammonium dithiophosphate.

Tris-ammonium dithiophosphate dihydrate, $$(NH_4)_3PO_2S_2 \cdot 2H_2O$$

is a relatively stable water-soluble compound that is readily prepared, for example by the hydrolysis of $P_2S_5$ with excess ammonium hydroxide [C. Kubierschky, Journal für Praktische Chemie, 31, 93 (1885)]. It has now been unexpectedly discovered that tris-ammonium dithiophosphate exhibits pesticidal and fertilizer properties. It has also been discovered that tris-ammonium dithiophosphate is a particularly effective low-cost nematocidal agent.

Accordingly, in one embodiment of this invention, there is provided a nematocidal composition comprising a major proportion of a finely divided, solid carrier and sition comprising a compound of tris-ammonium dithiophosphate.

In another embodiment, there is provided a method of treating agricultural soil comprising adding to said soil a growth improving amount of an agricultural fertilizer comprising a compound of tris-ammonium dithiophosphate.

In a further embodiment, there is provided a method of combating nematodes comprising treating a soil where nematodes can exist with an effective amount of a composition comprising a compound of tris-ammonium dithiophosphate.

It has further been unexpectedly discovered that while the compound employed in the present invention, to wit, tris-ammonium dithiophosphate exhibits unexpected nematocidal activity, other closely related compounds to wit, bis-ammonium thiophosphate $(NH_4)_2HPO_3S$, and ammonium phosphate $(NH_4)_2HPO_4$, do not exhibit an equivalent level of activity.

The present invention is further illustrated but not limited by the following examples.

Example 1

The nematocidal activities of tris-ammonium dithiophosphate, bis-ammonium dithiophosphate and ammonium phosphate against a species of Panagrellus, an active saprozoic nematode, were determined as follows: Into a stoppered test-tube containing a nematode population of 50–75 per tube was placed 10 ml. of an aqueous solution of the compound at the dosage level to be tested. The tubes were observed over a period of time and the results recorded as percent mortality, (i.,e., kill). The results of these tests are shown in Table I.

TABLE I

| Compound | Dose (p.p.m.) | Percent kill | | |
|---|---|---|---|---|
| | | 24 hrs. | 72 hrs. | 120 hrs. |
| Tris-ammonium dithio-phosphate·2H₂O. | 500 | 99 | 100 | 100 |
| | 50 | 67 | 70 | 73 |
| Bis-ammonium thiophosphate.. | 500 | 95 | 100 | 100 |
| | 50 | 0 | 45 | 53 |
| Ammonium phosphate | 500 | 5 | 50 | 60 |
| | 50 | 0 | 0 | 0 |

The results in Table I demonstrate that tris-ammonium dithiophosphate is a very effective nematocidal agent, whereas bis-ammonium dithiophosphate and ammonium phosphate exhibit a lesser degree of nematocidal activity.

In addition to its unexpected nematocidal activities, tris-ammonium dithiophosphate also exhibits effective fertilizer properties. When applied at rates normally used for fertilizers, for example 600 pounds per acre, it is not injurious to crops. Tris-ammonium dithiophosphate whether applied to soil or to foliage is not injurious to crops at normal application rates; for example, there was no injury up to a rate of 590 pounds per acre when applied to soil as a 2% solution in water. Foliar sprays were not injurious to crops even at higher concentrations.

Example 2

The phytotoxic properties of tris-ammonium dithiophosphate were determined by measuring the degree of injury of solutions of tris-ammonium dithiophosphate in water when applied to oats and soybeans at various concentration levels. The results of these tests are shown in Table II.

TABLE II

Treatments—                                  Percent plants killed
(1) Oats in sand culture—soil applications:
    8.5 mg. Tris-ammonium dithiophosphate·2H₂O
      +10 ml. H₂O _____ 0
    17 mg. Tris-ammonium dithiophosphate·2H₂O
      +10 ml. H₂O _____ 0
    34 mg. Tris-ammonium dithiophosphate·2H₂O
      +10 ml. H₂O _____ 0
    68 mg. Tris-ammonium dithiophosphate·2H₂O
      +10 ml. H₂O _____ 0
    136 mg. Tris-ammonium dithiophosphate·2H₂O
      +10 ml. H₂O _____ 0
    10 ml. of 1% solution _____ 0
    10 ml. of 2% solution _____ 10
    10 ml. of 5% solution _____ 40
(2) Foliar sprays (oats in sand culture and soybeans in potted soil):
    Oats, 1% solution _____ 0
    Soybeans, 1% solution _____ 0
    Soybeans, 2% solution _____ 0
    Soybeans, 5% solution _____ 0
    Soybeans, 10% solution _____ 0

The data in Table II show that tris-ammonium dithiophosphate is not injurious when applied to oats or soybeans as soil applications or foliar sprays at the concentration levels normally employed.

In addition to exhibiting pesticidal properties, particularly nematocidal activity, and in addition to its being noninjurious to crops, tris-ammonium dithiophosphate has been found to exhibit fertilizer properties.

Example 3

The fertilizer value of tris-ammonium dithiophosphate was compared with ammonium sulfate and with monocalcium phosphate. In these tests, phosphorus and nitrogen levels were equalized to limit the variable to one element. The tests were run on loamy sand at pH 6.4 using the short nitrogen and phosphorus uptake technique by oats. In this technique, nitrogen or phosphorus deficient oats are grown in the sand by periodic irrigation with nitrogen or phosphorus deficient nutrient solution. The oats are then transferred to treated soil and allowed to absorb the nitrogen or phosphorus. After a specified length of time the oats are cut and analyzed for nitrogen or phosphorus. The results of these tests are shown in Table III.

TABLE III

| | Nitrogen uptake | | | |
| --- | --- | --- | --- | --- |
| | Mg. N/cup taken up by oat tops [1] N rate, mg./cup | | | |
| Source | 0 | 21 | 42 | 63 |
| Tris-ammonium dithiophosphate·2H$_2$O | 1.57 | 1.90 | 2.33 | 2.41 |
| Ammonium sulfate | 1.57 | 1.96 | 1.98 | |
| | Phosphorus uptake | | | |
| | Mg. P/cup taken up by oat tops [1] P rate, mg./cup | | | |
| | 0 | 15.6 | 31.2 | 62.4 |
| Tris-ammonium dithiophosphate·2H$_2$O | 0.19 | 0.22 | 0.24 | 0.26 |
| Monocalcium phosphate | 0.19 | 0.27 | 0.54 | 0.57 |

[1] Averages of 3 replications.

The results in Table III demonstrate that tris-ammonium dithiophosphate provides a significant source of nitrogen and phosphorus which is readily taken up by crops, for example, oats.

As is apparent from the above, tris-ammonium dithiophosphate has utility as a pesticide particularly as a nematocide and also as a fertilizer.

As employed herein the term pesticide is intended to mean a chemical compound useful in pest control. Thus, the term pesticide is a generic term including insecticide, a fungicide, a herbicide, a nematocide and the like.

Tris-ammonium dithiophosphate may be employed according to the present invention singly or as a mixture with other pesticidal agents. Pesticidal compositions containing tris-ammonium dithiophosphate can be prepared by methods well known to those skilled in the art. Thus, for example, it can be applied as an undiluted spray or be reduced to an impalpable powder and applied as an undiluted dust or mixed with a solid carrier such as clay, talc, limestone, bentonite, diatomaceous earth, fillers earth, silica gel, pyrofillite, gypsum and similar materials in finely comminuted form which are well known in the art. In addition, it may be applied as a spray in a liquid carrier or as a solution in a solvent or as a suspension in the solvent or as a suspension in a nonsolvent. When applied as a spray in water, it may be desirable to incorporate wetting agent and/or dispersing agents.

In one particular embodiment of the present invention, the crude reaction mixture obtained from the hydrolysis of P$_2$S$_5$ with aqueous ammonia and which comprises tris-ammonium dithiophosphate, ammonium hydroxide, hydrogen sulfide and sulfur may be applied as an undiluted spray for pesticidal and fertilizer use.

It is to be understood that this invention is not limited to the specific examples which have been offered merely as illustrations but modifications may be made without departing from the spirit of the invention.

What is claimed is:

1. A nematocidal composition comprising a major proportion of a finely divided, solid carrier and a minor nematocidal amount of tris-ammonium dithiophosphate.

2. A method of combating nematodes comprising treating the nematodes with a nematocidally effective amount of a composition comprising tris-ammonium dithiophosphate.

3. A method according to claim 2 wherein said composition contains a carrier.

4. A method according to claim 3 wherein said carrier is water.

5. A method according to claim 3 wherein said carrier is a finely divided solid.

References Cited

Gmelins: Handbuch der Anorganischen Chemie, Verlag Chemie G.m.b.H., Weinheim/Bergston 1965, System-Number 16, Phosphur, Tiel C, p. 580.

Mellor, J. W.: A Comprehensive Treatise on Inorganic and Theoretical Chemistry, Green & Co., 1947, p. 1968.

ALBERT T. MEYERS, *Primary Examiner.*

SEYMOUR MONELLO, *Assistant Examiner.*

U.S. Cl. X.R.

71—33, 34